(12) United States Patent
Spruce (10) Patent No.: US 10,760,548 B2
(45) Date of Patent: Sep. 1, 2020

(54) EXTREME LOAD CONTROL

(71) Applicant: VESTAS WIND SYSTEMS A/S, Aarhus N (DK)

(72) Inventor: Chris Spruce, Leatherhead (GB)

(73) Assignee: VESTAS WIND SYSTEMS A/S, Aarhus N (DK)

(*) Notice: Subject to any disclaimer, the term of this patent is extended or adjusted under 35 U.S.C. 154(b) by 130 days.

(21) Appl. No.: 15/737,621

(22) PCT Filed: Jun. 22, 2016

(86) PCT No.: PCT/DK2016/050209
§ 371 (c)(1),
(2) Date: Dec. 18, 2017

(87) PCT Pub. No.: WO2017/000953
PCT Pub. Date: Jan. 5, 2017

(65) Prior Publication Data
US 2018/0171978 A1    Jun. 21, 2018

(30) Foreign Application Priority Data
Jun. 30, 2015 (DK) .................................. 2015 70411

(51) Int. Cl.
*F03D 7/02* (2006.01)
*G05B 9/02* (2006.01)

(52) U.S. Cl.
CPC ............. *F03D 7/0288* (2013.01); *G05B 9/02* (2013.01); *F05B 2270/1033* (2013.01);
(Continued)

(58) Field of Classification Search
CPC . F03D 7/0288; G05B 9/02; F05B 2270/1033; F05B 2270/1095;
(Continued)

(56) References Cited

U.S. PATENT DOCUMENTS 9,366,235 B2 * 6/2016 Evans ..................... F03D 17/00
9,577,421 B2 * 2/2017 Barker .................... H02H 3/16
(Continued)

FOREIGN PATENT DOCUMENTS

CN    1573776 A    2/2005
CN    103945640 A   7/2014
(Continued)

OTHER PUBLICATIONS

PCT International Search Report for Application No. PCT/DK2016/050209 dated Jun. 22, 2016.
(Continued)

*Primary Examiner* — Charles R Kasenge
(74) *Attorney, Agent, or Firm* — Patterson + Sheridan, LLP (57) ABSTRACT

Methods for calculating a maximum safe over-rated power demand for a wind turbine operating in non-standard conditions include the steps of determining a value indicative of a risk of exceeding an ultimate design load during operation in a standard operating condition, and establishing a maximum over-rated power demand corresponding to a maximum power that the turbine may produce under the non-standard operating condition without incurring an increased risk of exceeding the ultimate design load, with respect to operation in the standard condition. A method of over-rating a wind turbine, a wind turbine controller, a wind turbine and a wind power plant are also claimed.

19 Claims, 7 Drawing Sheets

(52) U.S. Cl.
CPC ... *F05B 2270/1095* (2013.01); *F05B 2270/32* (2013.01); *F05B 2270/321* (2013.01); *F05B 2270/329* (2013.01); *F05B 2270/332* (2013.01); *F05B 2270/708* (2013.01); *Y02E 10/723* (2013.01)

(58) Field of Classification Search
CPC ............ F05B 2270/32; F05B 2270/329; F05B 2270/332; F05B 2270/708; F05B 2270/321; Y02E 10/723
See application file for complete search history.

(56) References Cited

U.S. PATENT DOCUMENTS

| | | | | |
|---|---|---|---|---|
| 10,072,635 | B2* | 9/2018 | Fu | F03D 17/00 |
| 2013/0161956 | A1* | 6/2013 | Evans | F03D 7/042 |
| | | | | 290/44 |
| 2014/0203563 | A1* | 7/2014 | Bowyer | F03D 7/0284 |
| | | | | 290/44 |
| 2014/0304201 | A1* | 10/2014 | Hyldgaard | G05B 23/0275 |
| | | | | 706/12 |
| 2015/0134272 | A1* | 5/2015 | Fu | F03D 17/00 |
| | | | | 702/35 |
| 2016/0372912 | A1* | 12/2016 | Barker | H02H 3/16 |

FOREIGN PATENT DOCUMENTS

| | | |
|---|---|---|
| EP | 2249030 A2 | 11/2010 |
| EP | 2583125 A2 | 4/2013 |
| JP | H11350909 A | 12/1999 |
| WO | 2012/041326 A2 | 4/2012 |
| WO | 2013044925 A1 | 4/2013 |
| WO | 2017000953 A1 | 1/2017 |

OTHER PUBLICATIONS

Danish Patent OFfice Search Report for Application No. PA 2015 70411 dated Feb. 8, 2016.
PCT Written Opinion of the International Searching Authority for Application No. PCT/DK2016/050209 dated Jun. 22, 2016.
Chinese Office Action for Application No. 201680038751.X dated Nov. 30, 2018.

* cited by examiner

EXTREME LOAD CONTROL

The present invention relates to control methods and systems for a wind turbine. In particular, the invention provides methods and systems for controlling the extreme loads experienced by a turbine during over-rated operation.

Figure 1A:
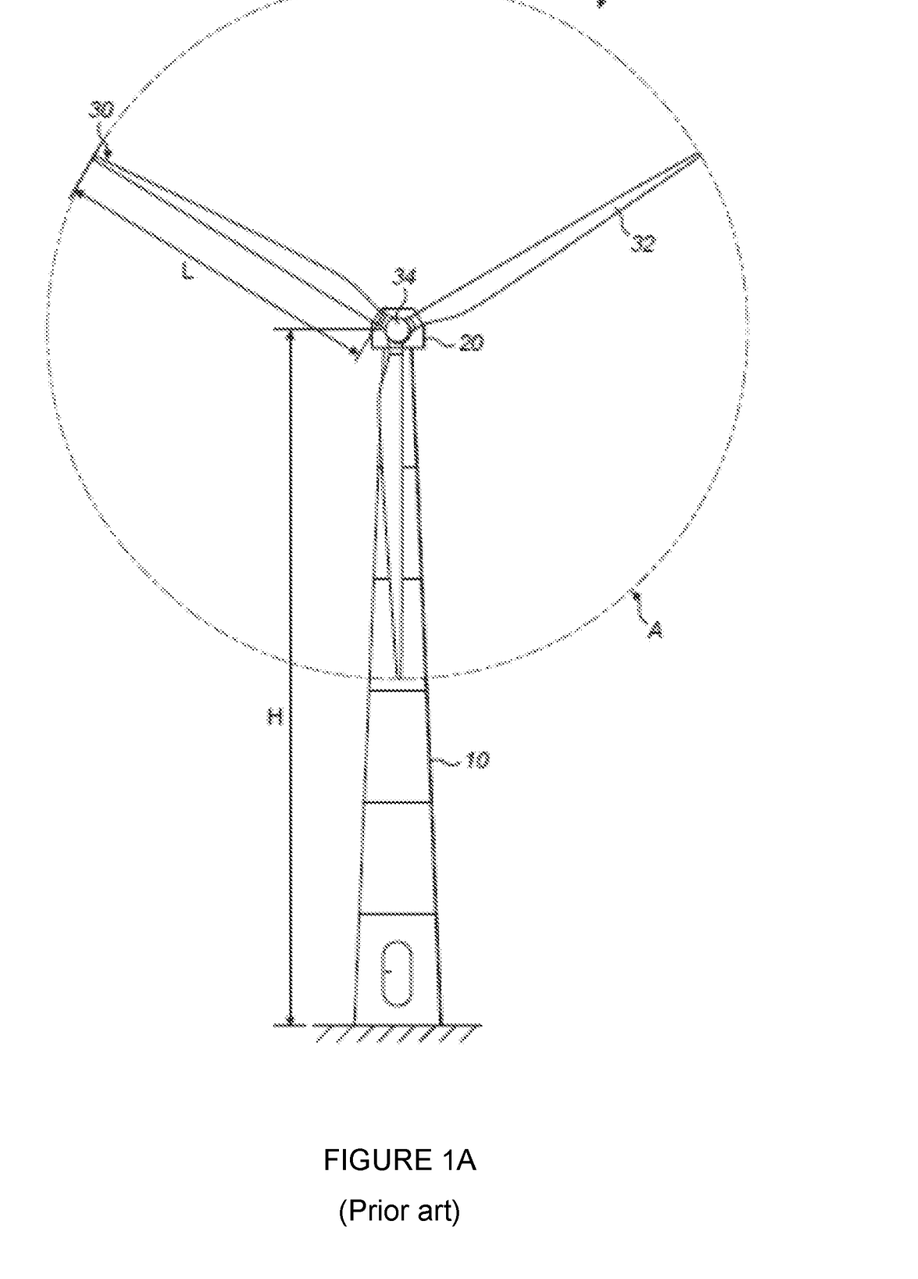
FIG. 1A is a schematic front view of a conventional wind turbine.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise any other number of blades 32, such as one, two, four, five or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the tips of the rotating blades 32. The swept area dictates how much of a given air mass is intercepted by the wind turbine 1 and, thus, influences the power output of the wind turbine and the forces and bending moments experienced by the various components of the turbine 1 during operation. The turbine may stand onshore, as illustrated, or offshore. In the latter case, the tower will be connected to a monopole, tripod, lattice or other foundation structure, and the foundation could be either fixed or floating.

Each wind turbine has a wind turbine controller, which may be located at the tower base or the tower top, for example. The wind turbine controller processes inputs from sensors and other control systems, and generates output signals for actuators such as pitch actuators, for generator torque control, for the generator contactors, for switches for activating shaft brakes, yaw motors, etc.

Figure 1B:
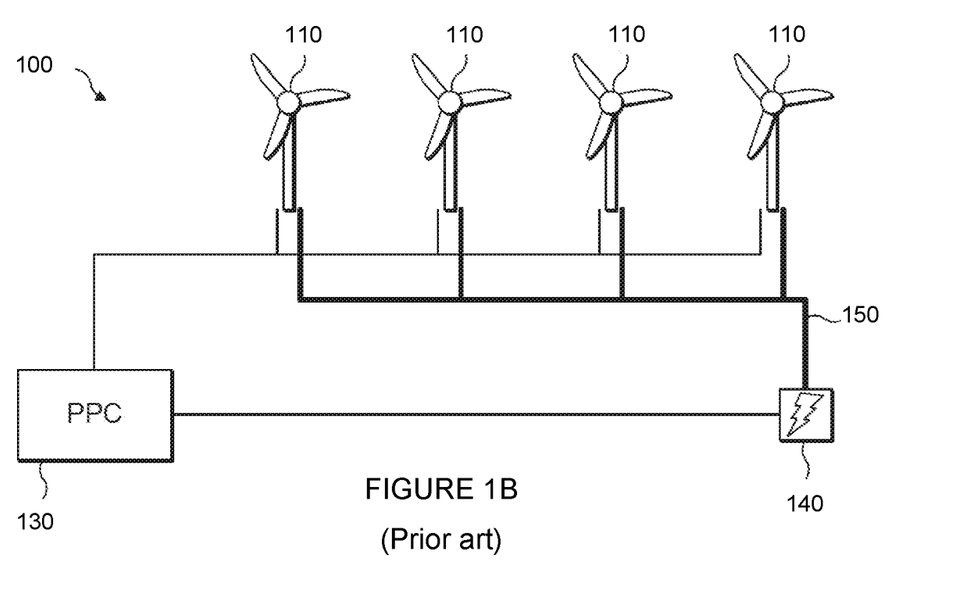
FIG. 1B is a schematic representation of a conventional wind power plant comprising a plurality of wind turbines.

FIG. 1B is a schematic illustration of an exemplary, conventional wind power plant (WPP) 100 comprising a plurality of individual wind turbines 110. Each of the turbines outputs power to a grid connection point 140, as illustrated by the thick line 150, and includes a controller (not shown) that communicates bi-directionally with a power plant controller (or PPC) shown as 130 in FIG. 1B.

The PPC 130 is shown schematically in FIG. 1B for ease of illustration. The PPC sends operational commands, including but not limited to power set points, to each of the turbines. The PPC also receives various inputs from the turbines, in particular data relating to the current values of turbine operating parameters, as well as alarm and other signals from elsewhere in the plant.

Though not shown in FIG. 1B, the PPC may further receive external commands from the grid relating to instantaneous demand for power. Specifically, where a downstream utility requires the WPP to adjust its active or reactive power output, a command or instruction to that effect is sent from the grid operator to the central plant controller 130, which may then act to adjust the operation of one or more of the turbines 110 accordingly.

Figure 2:
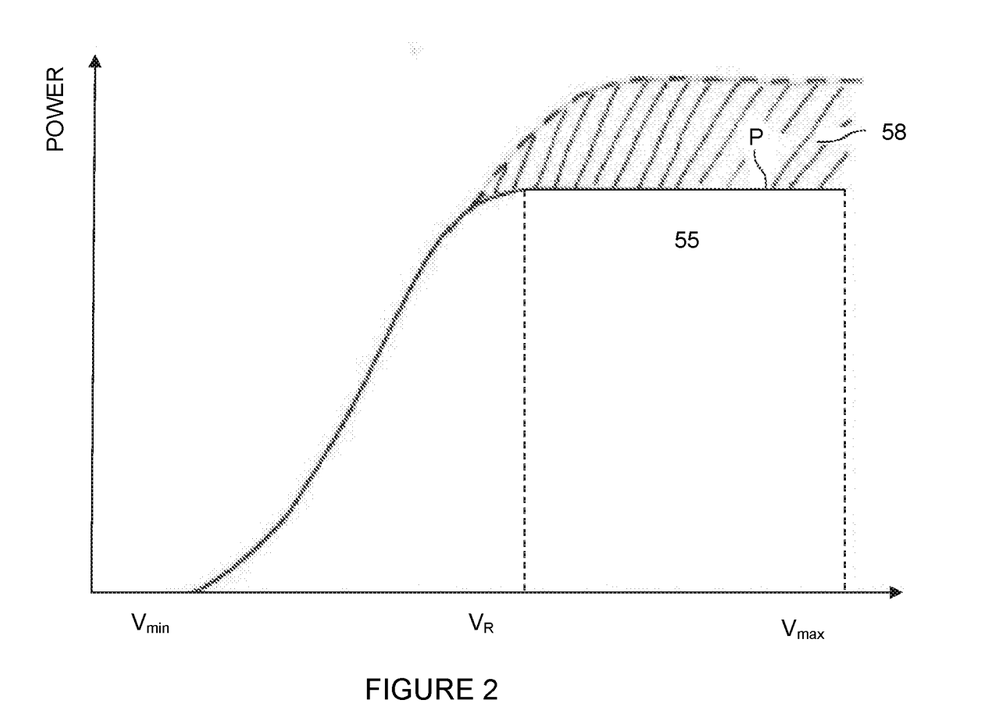
FIG. 2 is a graph illustrating a conventional power curve of a wind turbine.

FIG. 2 shows a schematic power curve 55 of a conventional wind turbine under normal operation. As is known to those of skill in the art, the power output (shown on the y-axis of the graph of FIG. 2) may be understood as a function of wind speed (shown on the x-axis in FIG. 2). In more detail, according to the normal power curve 55 a turbine will begin to generate power at a cut-in wind speed $V_{min}$ and will operate, for wind speeds between $V_{min}$ and a rated wind speed $V_R$, under partial (or part) load conditions. The rated wind speed represents the wind speed at which the turbine is designed to produce the associated nominal (or 'rated') generator power.

The rated power (also known as the name-plate power level) of a wind turbine is defined in International Standard IEC 61400-1 as the maximum continuous electrical power output that a wind turbine is designed to achieve under normal operating and external conditions. Large commercial wind turbines are generally designed for a lifetime of 20 to 25 years and their rated power output takes that lifespan into account. At rated power (equivalently, at wind speeds of $V_R$), the turbine is deemed to be operating under full load: the maximum load for which the turbine is equipped. Thus, conventional wind turbines are designed to operate at the rated power so that the design limits and fatigue life of their various components are not exceeded. In particular, output is held at the rated level even at wind speeds above $V_R$, as indicated by the horizontal line in FIG. 2.

For a typical wind turbine, $V_{min}$ may be around 3 ms$^{-1}$ and $V_R$ in the region of 12 ms$^{-1}$. Further indicated on the graph of FIG. 2 is a maximum wind speed $V_{max}$ above which continued deliverance of power from the turbine may become dangerous, in particular due to the loads experienced by the turbine components. Accordingly, $V_{max}$ represents a cut-out wind speed at which the turbine is taken out of power production mode (for instance, by parking or allowing the turbine to idle) until the wind speed has dropped once more. Alternatively, the power output may be ramped down as a function of wind speed to zero power. $V_{max}$ may typically be on the order of 25 ms$^{-1}$.

The rated power of a wind park, such as WPP 100 of FIG. 1B, is simply the sum of the rated powers of the individual turbines within the plant. In practice, however, that total rated power may rarely be reached. This may be for a range of reasons, such as less-than-ideal wind conditions at the specific sites of some of the individual turbines, or simply because one or more turbines may be non-operational (for example, undergoing maintenance) at any given time.

The fatigue damage accumulation rates of individual components in wind turbines vary substantially under different operating conditions. The rate of wear, or accumulation of damage, tends to increase as generated power increases. Wind conditions also affect rate of accumulation of damage. For some mechanical components, operation in very high turbulence causes a rate of accumulation of fatigue damage that is many times higher than in normal turbulence. For some electrical components, operation at very high local temperatures, which may be caused by high ambient temperatures, causes a rate of accumulation of fatigue damage, such as insulation breakdown rate, that is many times higher than in normal temperatures. As an example, a rule of thumb for generator windings is that a 10° C. decrease in winding temperature increases lifetime by 100%.

Recently, progress has been made in controlling wind turbines such that they can produce more than their rated power, as indicated by the shaded area 58 of FIG. 2. The term 'over-rating' is understood to mean producing more than the rated active power during full-load operation by controlling one or more turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not to reactive power. When a turbine is over-rated, it is run more aggressively than normal, and the generator has a power output that is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require shut down of the turbine for maintenance. As such, over-rating is characterised by a transient behaviour. When a turbine is over-rated it may be for as little as a few seconds, or for an extend period of time if the wind conditions and the fatigue life of the components are favourable to over-rating. The ability to resist loads is a key consideration in turbine design and must also be borne in mind in any control strategy, including over-rating control. The term 'design load' is used herein to refer to the magnitude of a particular stress that a turbine is designed to withstand.

The many and varied loads that may adversely affect the condition of a wind turbine are commonly divided into two main categories: fatigue loads, and extreme loads. Fatigue loading encompasses broadly those stresses that are, to a greater or lesser degree, constant and continuous whenever a wind turbine is in operation and which can cause turbine components to sustain material wear or degradation over time. Conversely, extreme loads, which are of interest here, typically arise due to one-time or infrequent events or weather conditions that may cause immediate and/or serious damage to a wind turbine or to its components. IEC 64100-1 defines a number of extreme events including, for instance, extreme operating gust, extreme turbulence and extreme wind shear. The absolute maximum loads that a wind turbine may be made to endure over its lifetime as a consequence of these extreme weather conditions are commonly referred to as the 'ultimate' (or 'limit') design loads for the turbine. The terms 'ultimate (design) load' and 'extreme (design) load' are used herein interchangeably.

The 'design envelope' consists of the range of operating parameters within which a turbine is designed to operate (operational design envelope) or survive (survival design envelope). For example, the operational design envelope for the operating parameter 'gearbox oil temperature' may be 10° C. to 65° C. In this case, the turbine is protected by alarms and, in the event that the gearbox oil temperature moves outside this range so as to place the turbine is outside its operational design envelope, will be shut down.

Thus, the design of a wind turbine is subject to a considerable number of assumptions about the manner in which the machine will operate once in place and the loads it will be subjected to as a result. In particular, given the desired power production levels of the turbine and meteorological data relating to its intended site, an estimate of the likely loading on various turbine components can be derived. This includes the fatigue loading that will ensue as a result of 'everyday use', as well as the extreme stresses that would load the turbine should an extreme event occur during its lifetime. The design of the structural, mechanical and electrical components of the turbine may then proceed, and is subject to the strict requirement of resisting all of the expected loads.

IEC 61400-1 requires turbines to be provided with adequate control and protection systems to ensure that, once in place and/or operative, the various applicable design loads are not exceeded. Whilst control functions continuously control the operation of the turbine by keeping the operating parameters within their normal limits, alarms (referred to in IEC 64100-1 as 'protection functions') are usually activated only as a result of failure of the control functions or, alternatively, due to the effects of a failure or of rare environmental conditions or a dangerous event.

When seeking to implement an over-rating control strategy on a given turbine design, fatigue loads can be addressed in one of a number of ways. For example, WO 2013/044925 describes a Life Usage Controller (LUC), which can enable maximal energy capture whilst ensuring that the fatigue loading of all components remains equal to or less than the design fatigue loads over the lifetime of the turbine.

However, a problem which, to the inventor's knowledge, remains to be addressed is the manner in which over-rating is prevented outright where an increase in power output could cause the ultimate design loads on one or more components to be exceeded. Further, even where over-rating is possible, it may only be possible to a very limited extent; that is, for only a relatively small increase in power output. In those cases, the benefits from over-rating are significantly inferior to the benefits that could be gained were all spare fatigue capacity to be utilised.

In addition, increasing numbers of modern turbine designs are limited by operational extreme loads; that is, extreme load cases that arise at wind speeds in the (operational) range of 4 to 25 $ms^{-1}$, as distinct from non-operational load cases that arise at wind speeds of over 40 $ms^{-1}$.

The present inventor has appreciated that extreme loads are likely to be a barrier to the successful deployment of over-rating control on many turbine designs for which over-rating can, in fact, be safely deployed.

Accordingly, this invention aims to provide improved wind turbine control systems and methods by means of which a wind turbine may be over-rated without materially increasing the risk of failure due to extreme loads.

SUMMARY OF THE INVENTION

The invention is defined in the independent claims, to which reference is now directed. Preferred features are set out in the dependent claims.

In one aspect, the invention provides a method for calculating a maximum safe over-rated power demand for a wind turbine operating in a non-standard operating condition. The method comprises the steps of determining a value indicative of a risk of exceeding an ultimate design load during operation in a standard operating condition, and of establishing a maximum over-rated power demand corresponding to a maximum power that the turbine may produce under the non-standard operating condition without incurring an increased risk of exceeding the ultimate design load, with respect to operation under the standard operating condition.

As used herein, the term 'standard operating condition' refers to the wind and other conditions assumed in turbine design under the IEC 61400-1 standard. In particular, 'standard operating conditions' is intended to imply operation at rated power for the turbine. By extension, 'non-standard operating condition' is used to refer to any situation in which one or more operating parameters or wind conditions differs from those defined in IEC 61400-1.

The invention may in some embodiments be applied to mitigate the risk of exceeding any one or more of the following loads: blade flap bending moments; blade edge bending moments; blade tip displacement, which affects the blade-to-tower clearance; pitch bearing moments; pitch actuator forces; pitch drive forces; hub bending moments; rotor tilt bending moment; rotor yaw-wise bending moment; main shaft torque; main shaft bending moments; main bearing bending moments; gearbox bending moments; gearbox torque; generator bending moments; generator torque; nacelle bedplate bending moments; yaw drive torques; yaw bearing bending moments; tower top bending moments; tower bending moments; tower base over-turning moment; foundation forces and moments; and support structure forces and moments.

According to preferred embodiments of the invention, the value indicative of a risk of exceeding an ultimate design load under the standard operating condition comprises a maximum value of the ultimate load that would be experienced by the turbine during an extreme event that is assumed to arrive during operation under the standard operating condition. Similarly, the risk of exceeding the ultimate design load under the non-standard operating condition comprises in these embodiments a maximum value of the ultimate load that the turbine would experience were an extreme event to occur during that operation.

In some embodiments, the value indicative of a risk of exceeding an ultimate design load comprises a probability of exceeding the ultimate design load that is calculated stochastically.

In a second aspect, a method of populating a look-up table for a wind turbine controller is provided. The method comprises the steps of calculating a maximum safe over-rated power demand for the turbine for each of a plurality of non-standard operating conditions.

In a third aspect, the invention provides a method of over-rating a wind turbine comprising the steps of determining an operating condition of the wind turbine and interrogating a look-up table populated as above to determine a maximum safe over-rated power demand for the wind turbine.

The invention further provides a wind turbine controller configured to perform the preceding method; a wind turbine comprising such a controller; and a wind power plant comprising a plurality of such wind turbines.

BRIEF DESCRIPTION OF THE DRAWINGS

Embodiments of the invention will now be described, by way of example only, with reference to the accompanying drawings in which.

DETAILED DESCRIPTION

A common approach to wind turbine design and, more particularly, to engineering a turbine to withstand the various loads it is expected to experience, is to consider in turn the various states or situations in which a turbine may be at any given time. Each of these so-called 'load cases' represents a design situation characterised by a set of loads and other conditions to be taken into account. The design load cases set out in IEC 64100-1 are given in Table 1 below. In the table, the letter 'U' in the penultimate column designates a load case analysed as an ultimate load case, and 'F' a fatigue load case.

As mentioned above, fatigue load cases are not the direct subject of this invention. The ultimate load cases can, for the purposes of the present discussion, be conveniently divided into three main classes. A first class includes non-operational load cases, such as the extreme (or 50-year) wind speed model (EWM) considered within the 'Parked' situation. These load cases are unaffected by a decision to over-rate the turbine, and so are ignored in the present context. Of the operational load cases, some are characterised by maximum component loads that are not a function of the wind condition. A fault, such as a generator short circuit, at nominal power would be one example (DLC 2.2). Again, the present invention is not concerned with those situations.

A third group of ultimate load cases includes those operational situations in which the magnitude of the maximum component loads to which the turbine is subjected is a function of the wind conditions. Examples of load cases falling within this third category and with which the present invention is concerned include: load case 1.3, power production during extreme turbulence (ETM); load case 1.4, power production with an extreme change of wind direction (ECD); and load case 3.2, startup with an extreme operating gust (EOG). Embodiments of the invention provide a control strategy that ensures that a turbine can be over-rated without materially increasing the risk of failure due to ultimate loads of this type.

TABLE 1

| Design Load Cases (or DLCs) (taken from IEC 61400-1) | | | | | |
|---|---|---|---|---|---|
| Design situation | DLC | | Wind condition | Other conditions | Type of analysis | Partial safety factors |
| 1) Power production | 1.1 | NTM | $V_{in} < V_{hub} < V_{out}$ | For extrapolation of extreme events | U | N |
| | 1.2 | NTM | $V_{in} < V_{hub} < V_{out}$ | | F | * |
| | 1.3 | ETM | $V_{in} < V_{hub} < V_{out}$ | | U | N |
| | 1.4 | ECD | $V_{hub} = V_r - 2$ m/s, $V_r, V_r + 2$ m/s | | U | N |

TABLE 1-continued

Design Load Cases (or DLCs) (taken from IEC 61400-1)

| Design situation | DLC | | Wind condition | Other conditions | Type of analysis | Partial safety factors |
|---|---|---|---|---|---|---|
| | 1.5 | EWS | $V_{in} < V_{hub} < V_{out}$ | | U | N |
| 2) Power production plus occurrence of fault | 2.1 | NTM | $V_{in} < V_{hub} < V_{out}$ | Control system fault or loss of electrical network | U | N |
| | 2.2 | NTM | $V_{in} < V_{hub} < V_{out}$ | Protection system or preceding internal electrical fault | U | A |
| | 2.3 | EOG | $V_{hub} = V_r \pm 2$ m/s and $V_{out}$ | External or internal electrical fault including loss of electrical network | U | A |
| | 2.4 | NTM | $V_{in} < V_{hub} < V_{out}$ | Control, protection, or electrical system faults including loss of electrical network | F | * |
| 3) Start up | 3.1 | NWP | $V_{in} < V_{hub} < V_{out}$ | | F | * |
| | 3.2 | EOG | $V_{hub} = V_{in}$, $V_r \pm 2$ m/s and $V_{out}$ | | U | N |
| | 3.3 | EDC | $V_{hub} = V_{in}$, $V_r \pm 2$ m/s and $V_{out}$ | | U | N |
| 4) Normal shut down | 4.1 | NWP | $V_{in} < V_{hub} < V_{out}$ | | F | * |
| | 4.2 | EOG | $V_{hub} = V_r \pm 2$ m/s and $V_{out}$ | | U | N |
| 5) Emergency shut down | 5.1 | NTM | $V_{hub} = V_r \pm 2$ m/s and $V_{out}$ | | U | N |
| 6) Parked (standing still or idling) | 6.1 | EWM | 50-year occurrence period | | U | N |
| | 6.2 | EWM | 50-year occurrence period | Loss of electrical network connection | U | A |
| | 6.3 | EWM | 1-year occurrence period | Extreme yaw misalignment | U | N |
| | 6.4 | NTM | $V_{hub} < 0.7 V_{ref}$ | | F | * |
| 7) Parked and fault conditions | 7.1 | EWM | 1-year occurrence period | | U | A |
| 8) Transport, assembly, maintenance and repair | 8.1 | NTM | $V_{maint}$ to be stated by the manufacturer | | U | T |
| | 8.2 | EWM | 1-year recurrence period | | U | A |

Over-rating implementations are described in earlier publications of the applicant (refer, for example, to GB 2491548). Moreover, the specific manner in which over-rating is achieved is not critical to the present invention. A detailed discussion of over-rating control is, therefore, not required. Nevertheless, an example of an over-rating method will be discussed briefly for ease of understanding of the invention.

Figure 3:
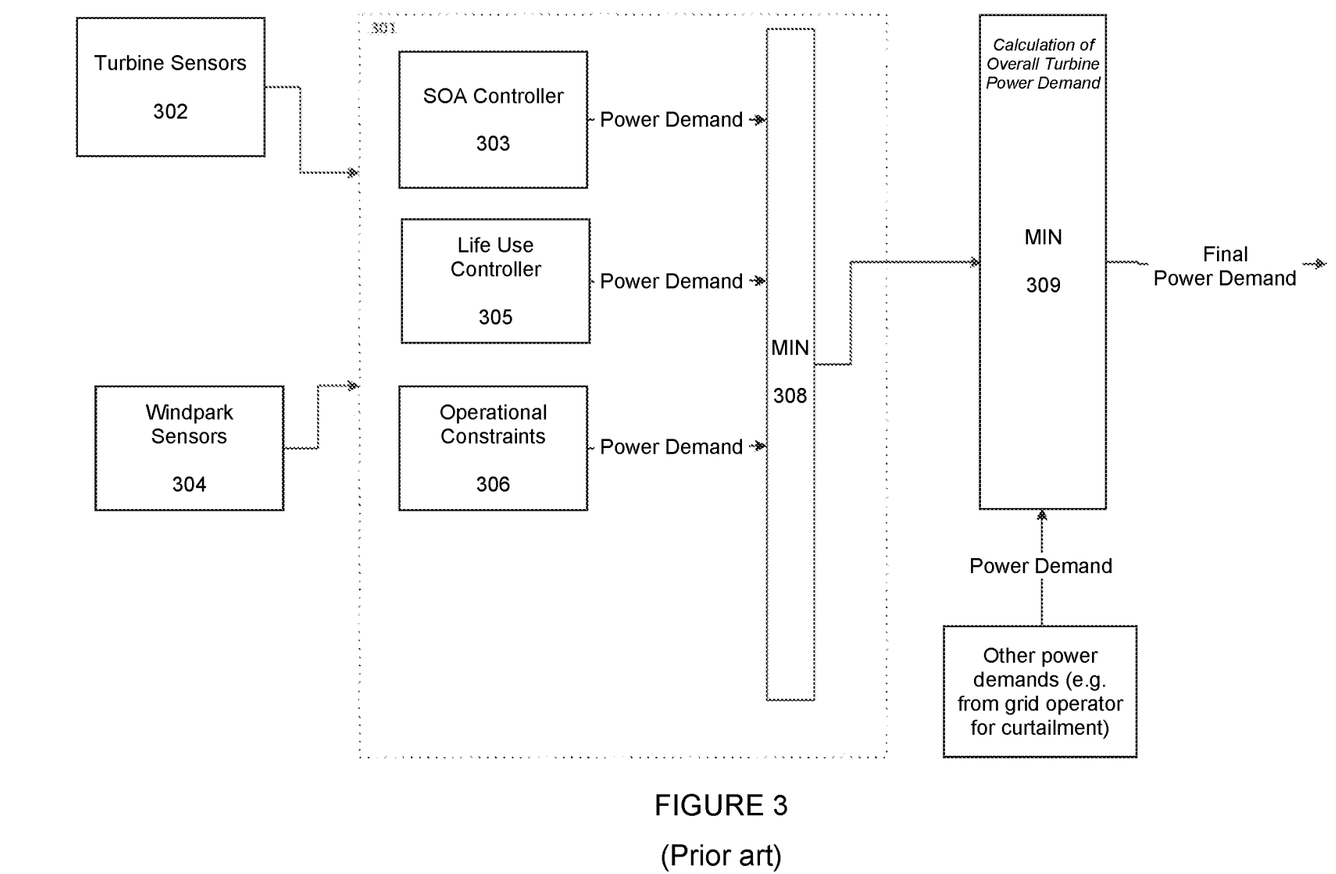
FIG. 3 is a schematic of a wind turbine controller arrangement.

FIG. 3 shows a schematic example of a turbine control arrangement in which an over-rating controller 301 generates an over-rating control signal that can be used by wind turbine controllers (not shown) to apply over-rating to the turbine. The over-rating control signal may be generated depending upon the output of one or more sensors 302/304 that detect operating parameters of the turbine and/or local conditions such as wind speed and direction. The over-rating controller 301 comprises one or more functional control modules that may be used in various aspects of over-rating control. Additional functional modules may be provided, the functions of modules may be combined and some modules may be omitted. The over-rating controller may be realised within a controller for a given wind turbine, or may in other embodiments form part of the central PPC for a wind power plant, configured to control the over-rating of one or more of the turbines within the plant.

Design loads calculated in accordance with one of the standard IEC Classes (IEC1A, IEC1B, and so on), are typically conservative on some sites, due to the variation in annual mean wind speed and turbulence intensity from site to site. For example, a turbine that has been designed to IEC2, for which the design annual mean wind speed is 8.5 ms$^{-1}$, will often be deployed on sites with annual mean wind speeds of below 8.0 ms$^{-1}$. In such cases, there is a gap between the design loads and the more benign loads actually experienced in operation. Over-rating exploits this gap.

The LUC 305 may use lifetime usage estimators (LUEs) to control the lifetime of the associated components. This control function compares the current estimate of component life used with a target value for life use at the current time in the life of the turbine. The amount of over-rating applied to the wind turbine is then manipulated to limit the rate of life use. The actuating signal for the LUC function at any time is the difference between the estimate of component life used and the target value for life use at that time.

Over-rating causes the power demand for the turbine to be increased in high winds until either an operating limit specified by an operational constraint (such as a temperature) is reached, or an upper power limit is reached that has been set to prevent component design loads from being exceeded. Operational constraints, implemented by operational constraints control module 306, limit the possible over-rating power demand as a function of various operating parameters. For example, where a protection function is in place to initiate shut down when the gearbox oil temperature exceeds 65° C. as mentioned above, an operational constraint may dictate a linear decrease in the maximum possible over-rating set point signal as a function of gearbox oil temperature for temperatures over 60° C., with "no over-rating possible" (i.e., a power set-point signal equal to the nominal rated power) at 65° C.

Currently, however, wind turbine control typically respects ultimate design loads absolutely. The present inventor has appreciated that those, as well as the fatigue design loads, represent a conservative approach, and that an increase in power output that might initially be identified and excluded as dangerous on the basis of those design loads might, by considering the full range of operating conditions in more detail, in fact be seen to carry a risk of failure that is no greater than that calculated under the standard set of load cases in IEC 64100-1.

Figure 4:
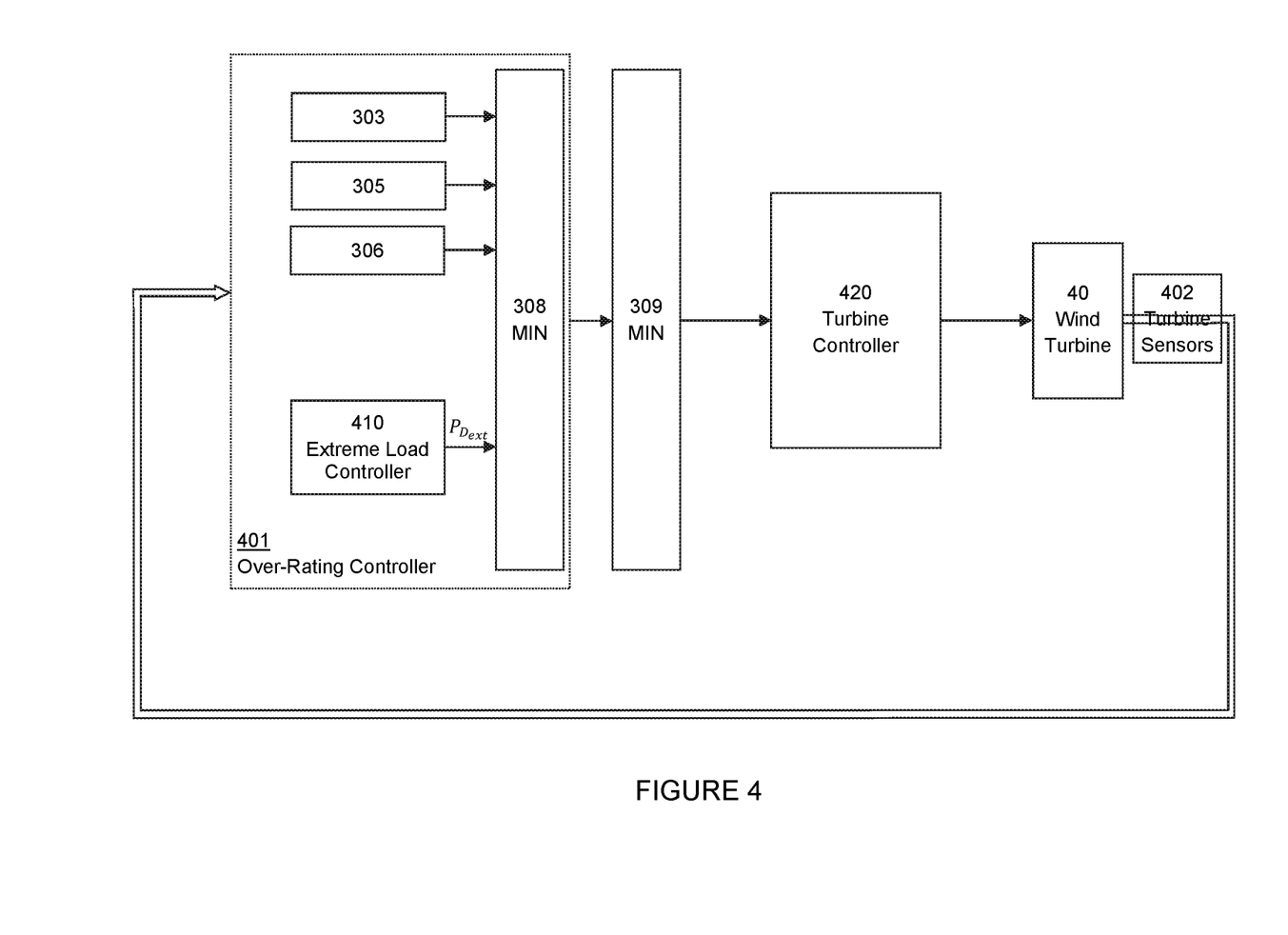
FIG. 4 illustrates in schematic overview the operation of the control system of the present invention according to one embodiment.

Accordingly, the present invention provides an extreme load controller for use in over-rating, and FIG. 4 illustrates in schematic overview the operation of that controller within a global over-rating control scheme according to one embodiment.

As shown in FIG. 4, the over-rating controller 401 for wind turbine 40 in this example includes, in addition to control modules 303, 305, 306 described above, an extreme load controller 410 that is arranged to receive and to process measurements taken from sensors 402 onboard the turbine. As discussed in further detail below, the output of the extreme load controller is a power demand $P_{D_{ext}}$ that is passed to minimum (or MIN) function 308. As also shown in FIG. 3, MIN function 308 also receives further power demands from the remaining over-rating control modules; and its output may be fed to an overall turbine power demand MIN function 309 to determine the prevailing power demand, the definitive power set point to be realised by the controller 420 for turbine 40.

In this example, the over-rating controller 401 receives measurements indicative of the following parameters:
1. wind speed;
2. yaw error;
3. air density;
4. vertical wind shear;
5. horizontal wind shear;
6. inflow angle; and
7. turbulence intensity.

Wind sensors are commonly adopted on large commercial wind turbines, and can be used to measure the wind speed directly.

Yaw error refers to the misalignment of the turbine nacelle with respect to the incoming wind direction, and can be derived from measurements of wind direction.

Air density may be estimated straightforwardly based on a knowledge of site elevation and ambient temperature, the latter being measured by conventional temperature sensors on board the turbine.

Vertical and horizontal wind shear can be estimated from measurements of blade loading by appropriate blade load sensing systems. For example, a blade load sensing system that measures blade root flapwise and edgewise strain signals at 50 Hz gives blade load measurements that can be used, together with measurements of the given blade's pitch angle and azimuth, to estimate the wind speed at the various azimuthal positions as it rotates. If the rotor rotates at 10 rpm, a 50 Hz measurement frequency gives 300 measurements per full blade rotation. This gives sufficient resolution to make an estimate of horizontal and vertical wind shear across the rotor.

The inflow angle of the incoming wind refers here to the angle of the incoming wind relative to wind travelling parallel to flat land; thus, for example, wind approaching a turbine up a steep slope has a positive inflow angle. The inflow angle may be estimated in one of several ways. It may be measured directly, for example using conventional tower- and/or nacelle-mounted anemometry or more sophisticated sensors such as LIDAR. Alternatively, measurements of wind direction may be used in conjunction with a look-up table for a turbine's geographical location to give inflow angles for each direction. The look-up table in this case will be constructed using topographic (contour) data for the land around the turbine.

Finally, turbulence intensity, defined as the ratio of the standard deviation of the wind speed to the mean wind speed in a certain averaging time, may again be measured or estimated using nacelle-mounted or ground-based LIDAR, or nacelle or spinner anemometer readings.

The extreme load controller 410 includes a look-up table which, given the measurements (or estimations) just outlined, may be used to determine the maximum power at which the turbine may be run without incurring an increased risk of exceeding one or more relevant ultimate design loads.

Specifically, this method exploits changes in operating conditions which give rise to a significant lowering of extreme loads, and in those cases the power level is increased until, for each load variable, the highest load reaches the level experienced in standard operation conditions. In the examples below, it is assumed that the design loads are driven by operational, rather than non-operational, load cases. Examples include:

Air Density

Power in the few stream wind is proportional to air density and the calculations in IEC 61400-1 are typically carried out for an air density of 1.225 $kgm^{-3}$. However, wind power plants on certain northern hemisphere locations experience air densities as low as 0.9 $kgm^{-3}$ under hot summer conditions, with annual average levels as low as 1.05 $kgm^{-3}$. The power in the wind incident upon the turbine in this case is 14% lower; therefore, extreme loads for a given load case are substantially lower, and the power output in this example can safely be raised while giving no higher risk of ultimate load failure than for operation at 1.225 $kgm^{-3}$.

Turbulence

Turbulence intensity affects extreme loads in IEC 61400-1 through the calculations in the ETM. Thus, a turbine with a low reference turbulence intensity relative to the original design can have its power output safely raised without taking on a higher risk of ultimate load failure than that of an identical turbine operating on a site with turbulence intensity equal to the design value.

The overall reference turbulence intensity of a given site depends on a range of factors. All of the following can give rise to a reference turbulence intensity that is significantly lower than the design value:

topography A turbine that has been designed for IEC Turbulence Class A, but is installed on a flat or nearly flat site, is likely to be over-designed with respect to the extreme loads;

inter-turbine spacings A turbine that has been designed for IEC Turbulence Class A, but is installed on a site with very large inter-turbine spacings (for example, greater than 10 rotor diameters in the prevailing wind direction(s)) is more likely to be over-designed with respect to the extreme loads than a turbine with small inter-turbine spacings (for example, four rotor diameters or less in the prevailing wind direction(s)); and atmospheric turbulence intensity A turbine that stands on a wind power plant location that is an area that benefits from generally low atmospheric turbulence, and hence a low reference turbulence intensity, $I_{ref}$ in IEC 61400-1 (for example, a coastal site with prevailing wind direction(s) coming from the sea) is more likely to be over-designed with respect to the extreme loads than a turbine in an area with high atmospheric turbulence (such as a site surrounded by mountains).

The look-up table may be populated by means of off-line simulations before the turbine 40 begins operation. Some alternative approaches to population of the look-up table in accordance with the invention will be described in detail with reference to the flowchart of FIG. 5.

Approach 1

Figure 5:
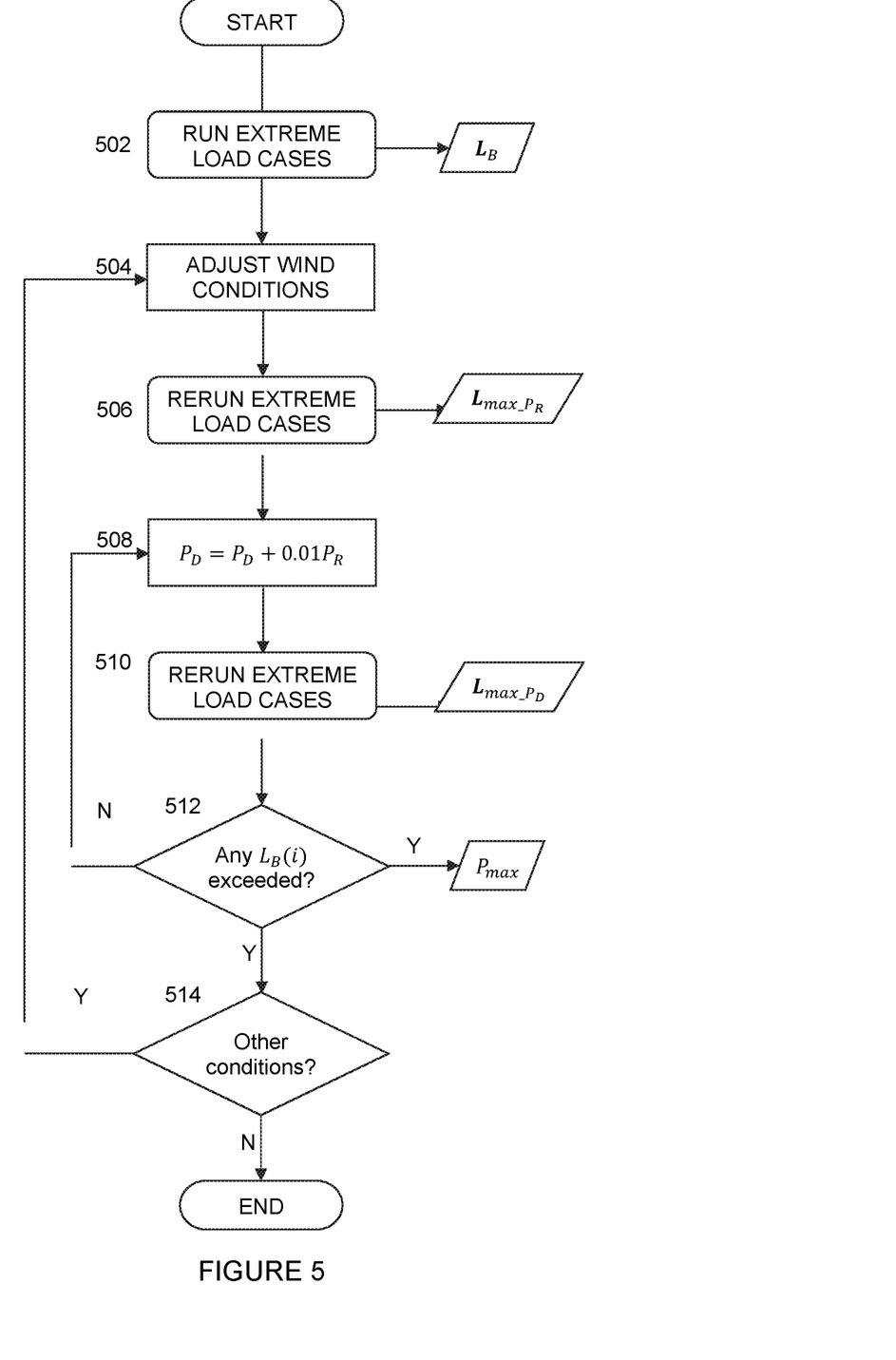
FIG. 5 is a flowchart outlining the configuration of the controller of FIG. 3 according to one embodiment of the invention.

A first approach to population of the look-up table follows the flow-chart outlined schematically in FIG. 5.

In a first step 502, the baseline extreme loads $L_B$ are identified by performing simulations of turbine operation under all of the extreme load cases of IEC 61400-1, i.e. those marked with a "U" in the column headed "Type of analysis" in Table 1. The output baseline loads are suitably stored, for example in a linear (or one-dimensional) array, for later use. These initial calculations, which assume the same, standard operating parameters used to inform the design of the turbine (in particular, a rated power output), constitute a first phase of the method of this approach.

In a second phase, the wind conditions that are not fixed as part of a load case are identified and are given new values, which may in operation cause extreme loads to be reduced. For example, air densities lower than 1.225 kgm$^{-3}$ generally lead to lower ultimate loads; as do reduced levels of vertical wind shear. Thus, at step 504, the wind conditions used in the simulations are set to represent a first such alternative scenario, and the simulations are then repeated at step 506. The resulting maximum loads for this first set of alternative wind conditions, and again assuming a rated turbine power output, are recorded as a linear array $L_{max\_P_R}$. Some or all of these loads are likely to be lower than the baseline loads $L_B$.

Next, at step 508, with the wind conditions now held at the values defined in step 504, the power demand $P_D$ of the turbine is incremented by, for example, 1% of the rated power $P_R$. The load cases are run once again at step 510 so as to calculate the maximum loads $L_{max\_P_D}$ resulting from this over-rated operation at more benign wind conditions.

These loads are then compared at step 512 with the baseline loads calculated at step 502.

If none of the baseline loads is found to be exceeded, the method returns to step 508: the power demand of the turbine is incremented; the simulations repeated; and the maximum loads compared with their baseline equivalents. This process is iterated until one of the baseline loads is found to be exceeded by a turbine operating in the given wind conditions and at the assumed over-rated power demand level. Once this is found to happen, the highest safe power demand $P_{max}$ (that is, the maximum power demand at which the turbine can run without exceeding any baseline extreme loads) is recorded.

The method then returns, in a third phase, to step 504: the iterative process just described is repeated for a further set of alternative wind conditions. When there are no further wind conditions to consider (decision step 514), the method ends.

The result of the process of FIG. 5 is a look-up table documenting the highest power demand that can safely be used for each combination of wind conditions; that is, the greatest possible operational envelope for over-rating control which does not materially increase the risk of ultimate load failure with respect to operation at rated power under standard conditions. The set of wind conditions to consider may, for example, consist of all permutations of decrementing values of air density, turbulence intensity and vertical wind shear exponent (this last parameter remaining greater than zero), each through a suitable range.

Approach 2

A variant of the method outlined in FIG. 5 may eliminate or reduce possible variations in calculated extreme loads that arise in individual load cases as the power demand is varied. Possible variations can arise due to the specific turbine operating state at a specific time (or times) when a potentially high load event (or events) occurs during a given extreme load case, specifically differences in the azimuth of each blade, the pitch angle of each blade and similar parameters. These parameters are a function of, amongst other variables, the turbine power demand. The maximum loads can be sensitive to azimuth and similar parameters, and can therefore be sensitive to the wind series starting point in a given load case.

In this embodiment, each load case is run (at steps 502, 506 and 510) multiple times (for example, 10 times), each of those simulations being characterised by different wind series starting points. In one example, the maximum extreme loads recorded at each step are then taken to be the largest values obtained across the 10 runs. Alternatively, the average of the maxima obtained may be used.

Approach 3

The approaches just described check that the risk of exceeding one or more ultimate design loads is not increased as a result of over-rating, in that they ensure that the loads themselves are not higher than those experienced at rated power output and under standard conditions.

The simulations of IEC 64100-1, which may be used in the methods just described, adopt a deterministic approach to load calculation for all extreme load cases with the exception of 1.3 (which uses the ETM). A further approach within the scope of the invention replaces those calculations with probabilistic or stochastic estimations. Here, actual probabilities that one or more design loads will, in fact, be exceeded are calculated both for standard and for over-rated operation. These probabilities are then compared so as to establish the maximum safe operating power for a turbine, given a presumed set of wind conditions. It is assumed here that Approach 1 or Approach 2 is used for load case 1.3.

The approach will be described in detail in the context of the extreme event defined in load case 3.2 of table 1 (startup with an EOG).

Figure 6:
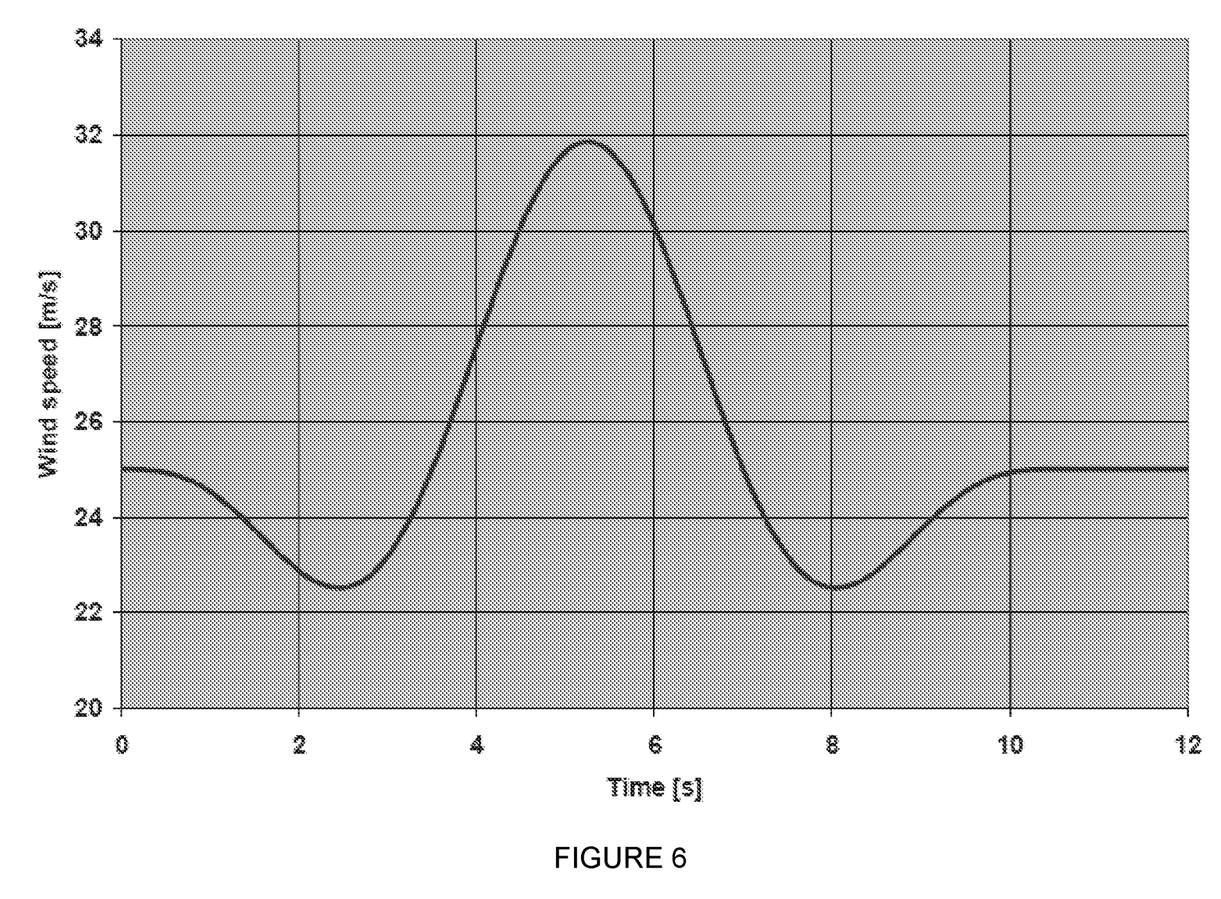
FIG. 6 is a graph illustrating the wind speed profile of a typical EOG event.

The EOG, illustrated schematically in FIG. 6, is defined to be the worst gust to be expected at a turbine site during a start or stop over a fifty-year period. A gust of this magnitude can impart a considerable thrust on the turbine rotor, and risks causing serious damage to the turbine. As shown in FIG. 6, gusts of this sort are typically characterised by comparatively short timescales, making it difficult to implement a protective control function in time to prevent or mitigate that damage. In addition and as also illustrated by the graph of FIG. 6, EOGs are often preceded by a dip in wind speed. This 'deceives' the turbine controller, which may attempt to increase the rotational speed of the turbine by adjusting the pitch angle of the blades to extract more power from the wind. This can make adequate, and adequately swift, protective action even more difficult to realise.

Furthermore, the eventual combination of an EOG with a grid failure may cause the turbine to undergo an emergency stop. Since such an emergency stop results in rotor thrust dropping quickly to zero, the arrival of an EOG may give rise to significant oscillations in the turbine tower.

Together, these considerations lead to the assumption that the EOG load case causes the maximum tower base overturning moment (OTM), which is one of the loads that must be taken into account in designing the turbine. The maximum OTM that the tower of the non-over-rated turbine is equipped to withstand during this load case is defined as the 'baseline OTM'. The look-up table may then be populated as follows.

Step 1

The method according to this approach begins as in Approach 2 with the calculation of the baseline extreme loads $L_B$, by running each load case (including the ETM) multiple (for example, 10) times with a power demand $P_D$ equal to rated power $P_R$. Again as in Approach 2, the baseline loads may be taken to be either the largest or the averages of the values obtained across the repeated runs.

Step 2

Next, and still with the turbine's power demand equal to rated power, each load case (apart from the ETM)—for example the EOG—is analysed as follows.

a. First, the load case is run multiple times, each assuming a different azimuthal starting position of the turbine rotor. For example, 12 simulations of the load case may be performed: one assuming blade 1 to be pointing vertically upwards (i.e., 0°); and the remaining 11 assuming the blade to begin 10° further around than the previous run (so that in the $12^{th}$ simulation, blade 1 begins at 110°).

b. Each of the twelve simulations is then divided into suitable time slices. For example, an EOG lasting 10 s may be divided into 20 intervals, each of 0.5 s.

c. At each of these defined times, the average of the turbine's key operating parameters is taken from across the twelve simulations to obtain an average value for the operating point for that time in the load case. These values include the pitch angles of each of the blades, the rotational speed of the rotor and the rotor torque.

d. Using those average operating points, and with turbulence applied, a number of stochastic simulations of turbine operation are then performed. For example, the operating points obtained at step c may be input to 10 simulations, each with a different seed factor for the wind input and each of 10 minute duration. During each run, the various loads (for example, the OTM, the drive-train torque, and so on) are tracked and plotted as a function of time. The values of these loads may be logged at a frequency of 20 Hz, for example.

e. Once the simulations are complete, the total time for which each load variable has been found to exceed its baseline value can be computed and converted into a probability of that occurrence. This could be done by calculating the probability for each of the 10 simulations individually, and then taking the average of those probabilities; or, equivalently, by summing the time for which the baseline load value is exceeded over all of the simulations and then dividing, in this case, by 100 minutes. As this probability is for non-over-rated operation, it is defined here as the 'baseline probability'.

f. Thus, for non-over-rated operation and for each predefined point in time during the given extreme load case, a baseline probability is obtained that each load variable will exceed the baseline value calculated at Step 1 above. These probabilities are then integrated over time to give a baseline probability that each load variable will exceed the respective baseline value over the course of the EOG.

This stochastic process is repeated for all load cases, with the exception of the ETM.

Step 3

The next step of this variant method follows steps 504 to 514 of the method of FIG. 5 but applying, rather than the deterministic simulations of IEC 61400-1, the probabilistic approach just described. Thus, a new set of wind conditions is assumed, which may cause loads to be reduced (step 504). To give a simple example, air density may be lowered to below 1.225 kgm$^{-3}$, with all other wind conditions fixed. At step 506 of FIG. 5, points a to f above are followed to obtain a probability that each load variable will exceed the baseline value over the course of an EOG under these revised conditions. The power demand is then incremented (step 508), and the probabilities calculated at each higher power level (510) until one load variable is found, for the given wind conditions, to exceed the baseline value with a probability greater than that with which it is exceeded during operation at rated power and under standard conditions. Once this is found to happen, the highest safe power demand $P_{max}$ (that is, the maximum output power at which the turbine can run without the probability exceeding the baseline probability) is recorded.

Step 4

Steps 1 to 3 are then repeated for all permutations of wind conditions of interest.

Thus, this process gives, for each foreseeable combination of wind conditions, the maximum power output level at which the turbine can operate without materially increasing the probability of exceeding one or more design loads with respect to the original operating strategy.

Thus, Approaches 1 to 3 each populate the look-up table with a maximum safe power demand as a function of wind conditions. Preferably, the power demand is interpolated between the discrete points for which it is calculated explicitly. The interpolation may be linear, for example.

Returning then to FIG. 4, during operation the extreme load controller 410 is able to discern, on the basis of the measurements received from the turbine 40, the maximum power demand at which the turbine can run without risking damage should an extreme event occur. Specifically, the controller looks up the maximum safe power demand as a function of each measurement received, and outputs this as a power demand signal $P_{D_{ext}}$. The extreme load controller receives input measurements and repeats this look-up process periodically. The extreme load controller may operate with a timestep of 1 second, for example.

Figure 7:
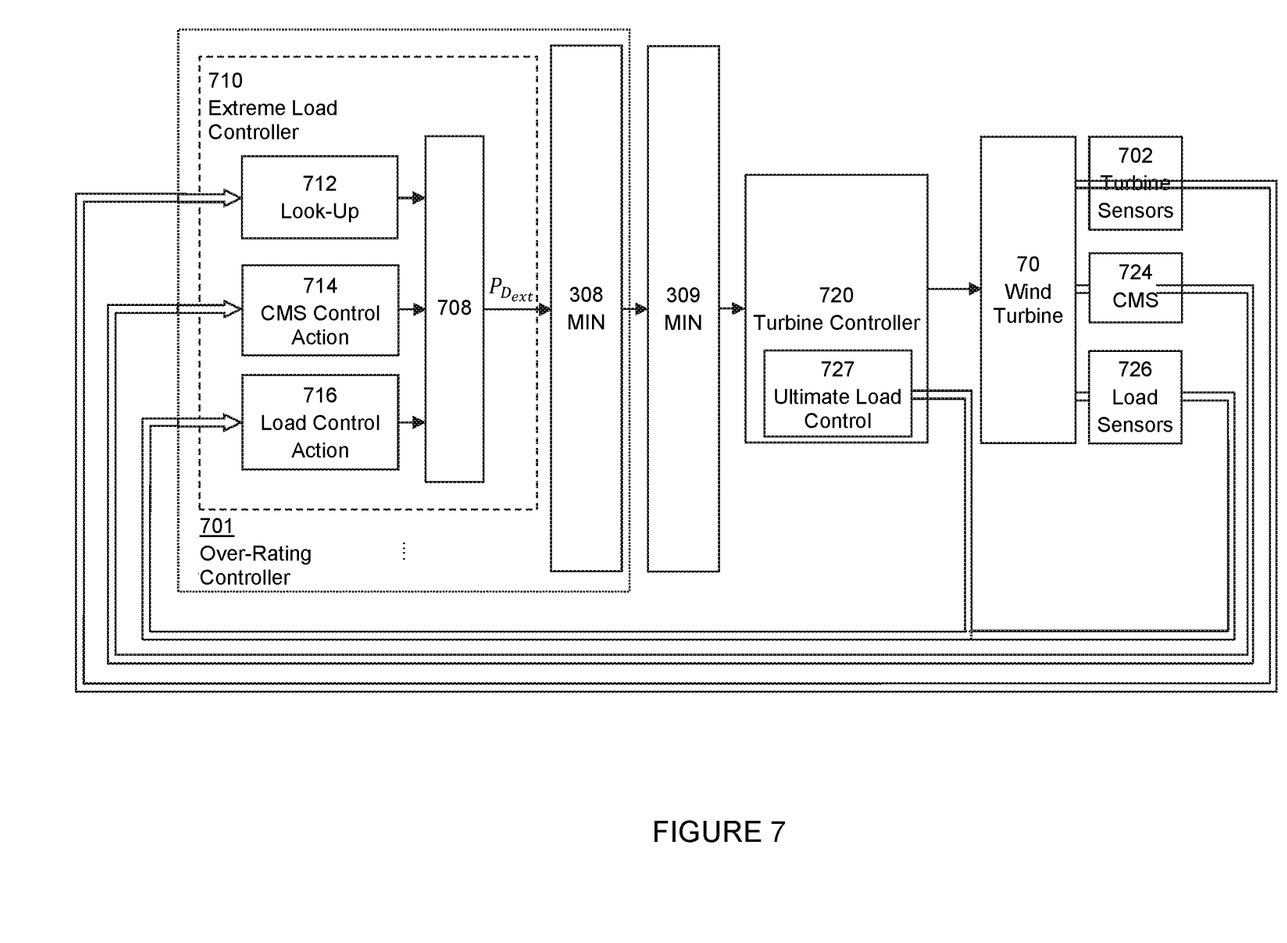
FIG. 7 is a schematic of a wind turbine control arrangement according to further embodiments of the present invention.

As mentioned, the off-line calculations presented above take as a starting point the standard conditions of IEC 61400-1. Further embodiments of the invention may tailor the level of over-rating determined through those calculations by making use of real-time data relating to the operation of a given turbine. Thus, an over-rated power demand for that turbine may be derived that may be more appropriate in view of turbine-specific circumstances. Examples of methods in accordance with these embodiments will be discussed with reference to FIG. 7. As shown in FIG. 7, an extreme load controller 710 within an over-rating controller 701 according to the present embodiments may be an extension of the controller 410 discussed above with reference to FIG. 4. In particular, in addition to the look-up table 712 generated and consulted as described above, extreme load controller 710 may include one or both of two additional control modules 714 and 716, described below. (The over-rating controller modules 303, 305, 306 of FIGS. 3 and 4, which may be included in over-rating controller 701, are omitted here for simplicity of illustration, as indicated generically by the "⋮" symbol). Similarly to the system of FIG. 4, the power demand $P_{D_{ext}}$ output by the extreme load controller 710 is fed, together with the outputs of the remaining over-rating controller modules, to MIN functions 308 and 309 so as to determine the final power demand to be realised by turbine controller 720 in control of the turbine 70.

Further shown in FIG. 7 are measurements fed from turbine sensors 702 to look-up table 712 as described above, and further inputs to extreme load controller 710 that will be discussed below.

A first extension to the methods described herein makes use of the condition monitoring system (CMS) commonly in place on commercial wind turbines, and shown as 724 in FIG. 7. As is known, these systems monitor the condition of various wind turbine components (in particular, components of the drive train), issuing first a warning and subsequently an alarm whenever a fault causes one or more operational limits of those components to be reached. Where a fleet of turbines has been in operation for a substantial number of years, turbine component failure cases can be examined statistically and a correlation sought between CMS signal outputs and ultimate failures of specific components.

For example, a gearbox failure mode that is known to be caused by ultimate loads may correlate with given changes in the CMS's outputs in the days, weeks or months leading up to the failure. In such a case, the given change in CMS output may be used as an input from the turbine system to a CMS control action module 714 within the extreme load controller. If a warning is observed during operation, the CMS control action module may override the output of the look-up table 712, issuing a power demand that includes 0% over-rating so as to minimise the risk of damage to the component in question. Alternatively, the output of CMS control action module 714 may act upon that of look-up table 712 to reduce the over-rating demand $P_{D_{ext}}$ that is fed to the turbine controller. For example, the CMS control action module may act to reduce the 'default' over-rating demand signal determined on the basis of the look-up table alone by half, for example, from 110% of rated power to 105%; or by any other amount that is determined to be suitable based on the nature of the warning. This multiplication may be performed by logic block 708. In other embodiments, module 714 may receive the output of look-up table 712 as input, modify it in accordance with the control action determined on the basis of CMS output, and send this modified signal directly to block 708.

Similarly, a second extension to the methods described above makes use of a load control action module 716 to modify the output of look-up table 712 based on external loading conditions that are specific to the particular microsite at which a given turbine is situated. Again where a fleet of turbines has been in operation for a number of years, a statistical analysis can be applied to those cases in which a major component failure has taken place, the root cause of which was ultimate loading of the turbine.

In this case, a correlation may be sought between the given failure and inputs from load sensors 726, or from sensors whose output can be processed to give a real-time estimate of a component load. Similarly to the CMS control action described above, a correlation between the frequency with which a load crosses a level which is close to (for example, 80% of) the ultimate load level of the given component and eventual failure due to extreme loading can be used to inform the power demand issued by the extreme load controller 710. Specifically, when the real-time frequency of load level exceedances is calculated from the signals fed from load sensors 726 to the load control action module 716, that module may again act to override or otherwise to temper the power demand that results from looking up the suitable over-rated power level in look-up table 712.

A further option for the load control action module 716, which can be used in addition to, or instead of, the method just described, is to seek a correlation between the given failure and the actions or outputs of existing ultimate load control features 727 that may be in place to protect against high or extreme loads. One example of such a control feature is described in EP 2 655 875, and is designed to realise rapid, infrequent individual blade pitch control actions that keep blade extreme loads within design loads when a turbine is situated in complex terrain. Similarly to both the CMS control action and the load sensing action described above, a correlation between the frequency with which one or more of these load control features is triggered and eventual failure due to extreme loading can be used to inform the power demand issued by the extreme load controller. Specifically, when the real-time frequency of triggering is fed from load control features 727 to the load control action module 716, that module may again act to override or otherwise to temper the power demand that results from looking up the suitable over-rated power level in look-up table 712. The reductions in over-rating commanded by modules 714 and 716 may again be implemented either within these modules, or by logic block 708.

Where two or more of the extension modules just described are implemented, the power demand $P_{D_{ext}}$ output by the extreme load controller 710 should be the lowest of the various power demands determined by each of those modules to be safe or appropriate given the conditions on the basis of which they operate. Accordingly, logic block 708 may include a MIN function, the task of which is to receive the compare the various 'safe' power demands determined by modules 712, 714 and/or 716 and to pass the lowest of these as the maximum safe power demand $P_{D_{ext}}$, which may or may not be an over-rated power demand, to the global MIN function 308 of the over-rating controller 701.

The advantage of the CMS-based approach, the use of real-time load sensor input and the use of real-time load control trigger frequency input is that the operation of the extreme load controller 710 is adapted more precisely to the local site conditions of the location on which the turbine stands via the use of high-frequency real-time data, rather than relying solely on purely offline calculations.

It should be noted that embodiments of the invention may be applied both to constant-speed and to variable-speed turbines. The turbine may employ active pitch control, whereby power limitation above rated wind speed is achieved by feathering: rotating all or part of each blade to reduce the angle of attack. Alternatively, the turbine may employ active stall control, which achieves power limitation above rated wind speed by pitching the blades into stall, in the opposite direction to that used in active pitch control.

The invention claimed is:

1. A method for calculating a maximum safe over-rated power demand for a wind turbine operating in a non-standard operating condition, the method comprising:
   determining a value indicative of a first risk of exceeding an ultimate design load during operation of the wind turbine in a standard operating condition;
   establishing a maximum over-rated power demand corresponding to a maximum power that the wind turbine may produce under the non-standard operating condition at a second risk of exceeding the ultimate design load, wherein establishing the maximum over-rated power demand comprises:
      determining, for each of a plurality of over-rated power demands, a respective value indicative of the second risk; and
      selecting, from the plurality of over-rated power demands, a largest over-rated power demand for which the second risk is not greater than the first risk; and
   generating, in accordance with the maximum over-rated demand, an over-rating control signal to be applied to the wind turbine.

2. The method of claim 1, wherein the operating condition comprises one or more of the following: wind speed, yaw error, air density, vertical wind shear, horizontal wind shear, inflow angle, and turbulence intensity.

3. The method of claim 1, wherein determining the value indicative of the first risk comprises:
   calculating a maximum value of an ultimate load experienced by the wind turbine during operation in an extreme event.

4. The method of claim 3, wherein the extreme event is an extreme design load case.

5. The method of claim 1, wherein determining the value indicative of the first risk comprises:
   calculating a maximum value of an ultimate load experienced by the wind turbine during operation in each of a plurality of extreme events; and
   selecting a largest of the calculated maximum values.

6. The method of claim 5, wherein the ultimate load comprises one or more of the following: a tower base over-turning moment, a flapwise bending moment on a blade of the wind turbine, an edgewise bending moment on the blade, a torque of a drive train of the wind turbine, a tilt bending moment on a rotor of the wind turbine, and a yaw-wise bending moment on the rotor.

7. The method of claim 3, wherein calculating the maximum value of the ultimate load experienced by the wind turbine during operation in the extreme event comprises:
   performing a plurality of simulations of operation of the wind turbine in the extreme event;
   for each of the plurality of simulations, establishing a simulated maximum value of the ultimate load experienced during the extreme event; and
   selecting a largest of the simulated maximum values.

8. The method of claim 3, wherein calculating the maximum value of the ultimate load experienced by the wind turbine during operation in the extreme event comprises:
   performing a plurality of simulations of operation of the wind turbine in the extreme event;
   for each of the plurality of simulations, establishing a simulated maximum value of the ultimate load experienced during the extreme event; and
   calculating an average of the simulated maximum values.

9. The method of claim 7, wherein each of the plurality of simulations is characterized by a different wind series starting point.

10. The method of claim 1, wherein determining the value indicative of the first risk comprises:
    calculating a baseline value comprising a maximum value of an ultimate load experienced by the wind turbine in an extreme design load case during operation of the wind turbine in the standard operating condition; and
    for each of a plurality of time intervals in the extreme design load case, simulating operation of the wind turbine to determine a respective probability of exceeding the baseline value.

11. A method of over-rating a wind turbine, the method comprising:
    determining an operating condition of the wind turbine;
    determining, using a look-up table, a maximum safe over-rated power demand for the wind turbine for the operating condition, wherein the look-up table is populated by calculating a maximum over-rated power demand for each of a plurality of non-standard operating conditions of the wind turbine, the calculating comprising:
       determining a value indicative of a first risk of exceeding an ultimate design load during operation in a standard operating condition of the wind turbine; and
       for each non-standard operating condition, establishing a maximum over-rated power demand corresponding to a maximum power that the wind turbine may produce under the non-standard operating condition at a second risk of exceeding the ultimate design load that is not greater than the first risk; and
    generating, in accordance with the maximum safe over-rated power demand for the operating condition, an over-rating control signal to be applied to the wind turbine.

12. The method of claim 11, further comprising:
    reducing the maximum safe over-rated power demand in response to a warning from a condition monitoring system for the wind turbine.

13. The method of claim 11, further comprising:
    determining a frequency that a load level is exceeded for a wind turbine component, wherein the load level is close to an ultimate load level for the wind turbine component; and
    reducing the maximum safe over-rated power demand based on the frequency.

14. The method of claim 11, further comprising:
    determining a frequency of triggering of one or more ultimate load control features for the wind turbine; and
    reducing the maximum safe over-rated power demand based on the frequency.

15. A controller for a wind power plant, the controller comprising one or more computer processors configured to perform an operation of over-rating a wind turbine in the wind power plant, the operation comprising:
    determining an operating condition of the wind turbine;
    determining, using a look-up table, a maximum safe over-rated power demand for the wind turbine for the operating condition, wherein the look-up table is populated by calculating a maximum over-rated power demand for each of a plurality of non-standard operating conditions of the wind turbine, the calculating comprising:
       determining a value indicative of a first risk of exceeding an ultimate design load during operation in a standard operating condition of the wind turbine; and for each non-standard operating condition, establishing a maximum over-rated power demand corresponding to a maximum power that the wind turbine may produce under the non-standard operating condition at a second risk of exceeding the ultimate design load that is not greater than the first risk; and generating, in accordance with the maximum safe over-rated power demand for the operating condition, an over-rating control signal to be applied to the wind turbine.

16. A method comprising:

determining, for each extreme event of a plurality of extreme events, a respective maximum value of an ultimate load experienced by a wind turbine during operation in the extreme event;

determining a value indicative of a first risk of the wind turbine exceeding an ultimate design load during operation in a standard operating condition, wherein determining the value indicative of the first risk comprises selecting a largest of the determined maximum values;

determining a first maximum over-rated power value that the wind turbine may produce under a first non-standard operating condition at a second risk of exceeding the ultimate design load that is not greater than the first risk; and generating, in accordance with the first maximum over-rated power value, an over-rating control signal to be applied to the wind turbine.

17. The method of claim 16, further comprising:

determining a plurality of maximum over-rated power values, wherein each maximum over-rated power value corresponds to operating the wind turbine in a respective non-standard operating condition of the wind turbine, and wherein the plurality of maximum over-rated power values comprises the first maximum over-rated power.

18. The method of claim 17, further comprising:

populating, using the plurality of maximum over-rated power values, a look-up table for a controller of the wind turbine.

19. The method of claim 16, wherein the ultimate load comprises one or more of the following: a tower base over-turning moment, a flapwise bending moment on a blade of the wind turbine, an edgewise bending moment on the blade, a torque of a drive train of the wind turbine, a tilt bending moment on a rotor of the wind turbine, and a yaw-wise bending moment on the rotor.

* * * * *